Oct. 20, 1953 C. L. FAUDELL 2,656,413

TELEVISION RECEIVER

Filed July 24, 1948

Inventor
Charles Leslie Faudell
By J. O. Ollier
Attorney

Patented Oct. 20, 1953 2,656,413

UNITED STATES PATENT OFFICE 2,656,413

TELEVISION RECEIVER

Charles Leslie Faudell, near Stoke Poges, England, assignor to Electric & Musical Industries Limited, Hayes, England, a company of Great Britain Application July 24, 1948, Serial No. 40,530
In Great Britain July 31, 1947

8 Claims. (Cl. 178—7.3)

This invention relates to television receivers.

A frequent form of disturbance encountered in television reception is caused by television signals reaching the receiver after reflection from aircraft or other moving reflecting objects and interfering with signals received by a direct path from the transmitter. One effect of this interference is fading of the mean brightness of the viewed image, and is particularly disturbing if the strength of the reflected signals approaches the strength of the directly received signals. The frequency of fading lies mainly in the range between 30 cycles per second and one cycle in several seconds.

It is the object of the invention to provide a television receiver whereby the effect of interfering reflected signals is rendered less noticeable in the reconstituted picture.

According to the invention there is provided a television receiver comprising a signal channel adapted to pass signals of the field and higher frequencies but to attenuate signals of lower than field frequency down to a frequency of at least 1 cycle per second and to transmit the D. C. component of the signals, thereby substantially to reduce fading of the mean brightness of the reconstituted picture due to television signals reflected from moving objects.

Figure 1:
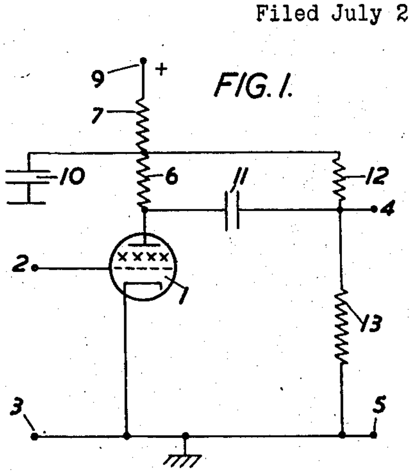
Figure 2:
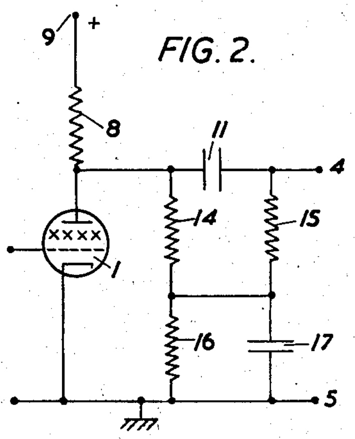
Figure 3:
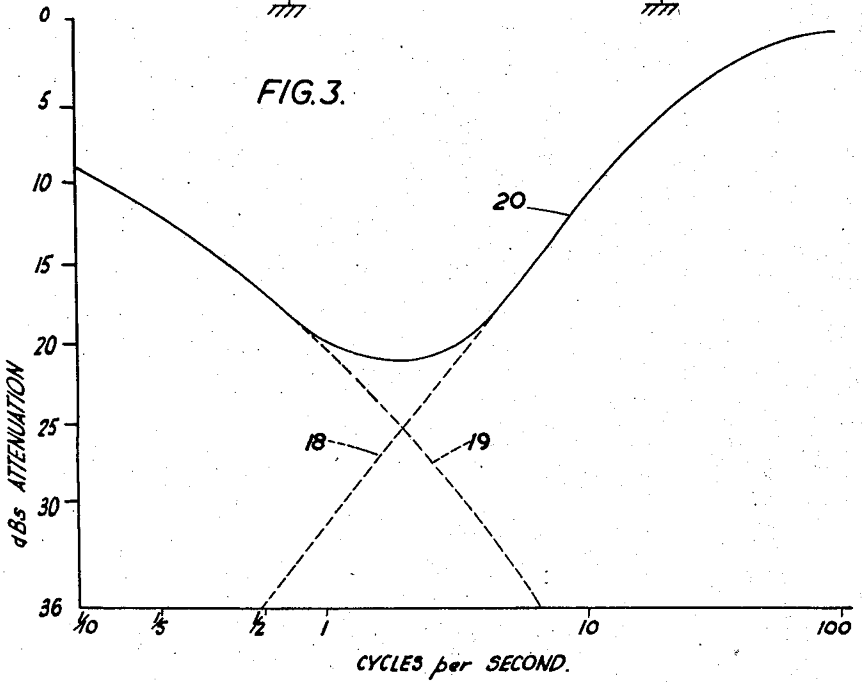
Figure 4:
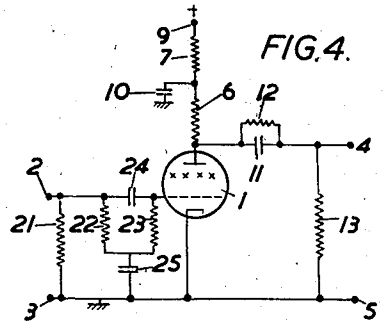
Figure 5:
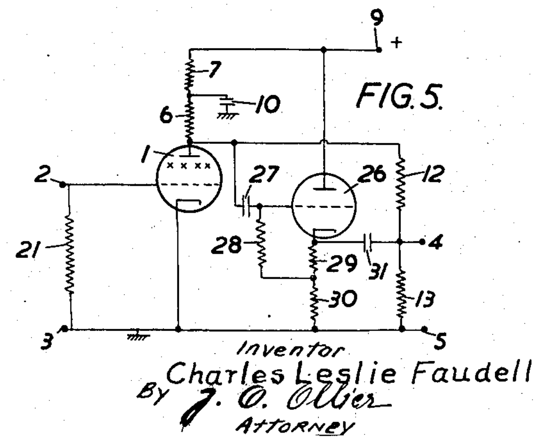

In order that the said invention may be clearly understood and readily carried into effect, the same will now be more fully described with reference to the accompanying drawing, in which:

Figure 1 shows part of a television receiver having a signal channel according to one form of the invention, Figure 2 shows part of a television receiver having a signal channel according to another form of the invention, Figure 3 is a graph showing the attenuation at various frequencies due to a specific signal channel of the form shown in Figure 2, and Figures 4 and 5 show parts of television receivers having signal channels according to further forms of the invention.

Referring to Figure 1, reference numeral 1 indicates an electron discharge amplifying tube, included in a signal channel having input terminals 2 and 3 and output terminals 4 and 5. Television signals with their D. C. components are applied to the input electrodes of tube 1 via terminals 2 and 3, and the amplified signals are fed to output terminals 4 and 5. The anode of tube 1 is connected via resistors 6 and 7 to positive H. T. terminal 9, and the junction of resistors 6 and 7 is connected to ground via a capacitor 10. The anode of tube 1 is coupled via a capacitor 11, to output terminal 4 and the junction of resistors 6 and 7 is connected to ground via a capacitor 10. The anode of tube 1 is coupled via a capacitor 11, to output terminal 4 and the junction of resistors 6 and 7 is connected to terminal 4 via a resistor 12. Between terminals 4 and 5 is connected a resistor 13 which with resistor 12 forms a potential divider so that terminal 4, which may for example be connected to the control electrode of the cathode ray tube of the receiver, is maintained at an appropriate potential.

Capacitor 11 provides an A. C. path between the anode of tube 1 and terminal 4, and with resistor 13 forms a filter circuit which transmits the picture signals and the line and field synchronising pulses, but attenuates signals of frequencies lower than that of the field synchronising pulses. For example, in a receiver employing interlaced scanning with 50 frames per second, said filter circuit is arranged to transmit signals at and above 50 cycles per second but to attenuate signals of a lower frequency, the attenuation being substantial at and below a frequency of 30 cycles per second.

Resistors 6 and 12 provide a D. C. path, in parallel with the A. C. path, between the anode of tube 1 and terminal 4, and resistor 7 and capacitor 10 form a filter circuit such that signals having a frequency above 1 cycle per second are attenuated. Said filter circuit may be such for example that signals of a higher frequency than 0.5 per second are substantially attenuated, whilst the D. C. component and slow variations thereof are transmitted. The signal channel thus substantially attenuates signals at frequencies in the range of 0.5 to 30 cycles per second.

Referring now to Figure 2, which shows another form of coupling circuit, the anode of tube 1 is connected to positive H. T. terminal 9 via anode resistor 8, and to output terminal 4 via capacitor 11, which is shunted by resistors 14 and 15 in series, the junction of resistors 14 and 15 being connected to ground via a resistor 16 and a shunt capacitor 17.

Television signals, comprising the full D. C. component, are applied to input terminals 2 and 3, and appear in amplified form across anode resistor 8. Capacitor 11 provides an A. C. path between the anode of tube 1 and output terminal 4, and with resistor 15 forms a filter circuit producing negligible attenuation and phase shift of signals at and above the field frequency, e. g., 50 cycles per second, but attenuating signals of lower frequency, the attenuation increasing as the frequency decreases. Resistors 14 and 15 provide a D. C. path between the anode of tube 1 and output terminal 4, and resistor 14 and capacitor 17 form a filter circuit such that the D. C. component and slow variations thereof are transmitted to terminal 4 but signals of a frequency above 1 per second are substantially attenuated. Resistor 16 serves to reduce the D. C. component (see British patent specification No. 505,899), about 60 per cent only of the D. C. component being retained.

The effect of the filter circuits is shown in Figure 3 wherein attenuation is plotted against frequency for a signal channel according to Figure 2 wherein the components have the following values:

| | | |
|---|---|---|
| Resistor 8 | ohms | 5,500 |
| Resistor 14 | do | 100,000 |
| Resistor 15 | do | 22,000 |
| Resistor 16 | do | 220,000 |
| Capacitor 11 | μF | 0.25 |
| Capacitor 17 | μF | 8 |

Curve 18 shows the pass characteristic of the A. C. path and curve 19 shows that of the D. C. path. The attenuation due to filter circuit 11, 15 alone is negligible at and above 50 cycles per second, but is 10 dbs at 10 cycles per second and 30 dbs at 1 cycle per second. The attenuation due to filter 14, 17 alone is 8 dbs at $\frac{1}{10}$ of a cycle per second and 20 dbs at 1 cycle per second. The combined effect of the filter circuits is shown by the full-line curve 20, which shows that the peak attenuation occurs in the range of 1 to 3 cycles per second and is of the order of 20 dbs. The result is a very noticeable reduction of the objectionable fading of the mean brightness of the viewed image.

Referring now to Figure 4, television signals, including the D. C. component, are applied to terminals 2 and 3, resistor 21 representing the output load of the preceding stage, and are fed to the input electrodes of tube 1 via a network comprising a capacitor 24 which is shunted by resistors 22 and 23 the junction of which is connected to ground via capacitor 25. The anode of tube 1 is connected to positive H. T. terminal 9 via resistors 6 and 7 the junction of which is connected to ground via capacitor 10. The anode of tube 1 is connected to output terminal 4 via capacitor 11 and shunt resistor 12, and a resistor 13 is connected between output terminals 4 and 5. Resistors 22 and 23 form a D. C. path between terminal 2 and the control electrode of tube 1, an A. C. path being provided by capacitor 24. Capacitor 11 provides an A. C. path between the anode of tube 1 and terminal 4, and with resistor 13 forms a filter circuit which transmits signals at and above 50 cycles per second but attenuates signals of a lower frequency. The D. C. path between terminals 2 and 4 includes two filter circuits one of which is in the output circuit of tube 1 and is constituted by resistor 7 and capacitor 10, and the other of which is in the input circuit to tube 1 and is constituted by resistor 22 and capacitor 25. The total effect of said filter circuits in the D. C. path is such that signals of a frequency above 1 cycle per second are attenuated but signals of a lower frequency are transmitted to output terminals 4 and 5 via resistor 12, whereby the D. C. component and slow variations thereof appear at terminals 4 and 5.

In the signal channel of Figure 4 two filter circuits are provided at different parts of the D. C. path. If desired, a single filter circuit may be provided in the part of the signal channel preceding tube 1, filter circuit 7, 10 being omitted and filter circuit 22, 25 being such that signals of a frequency below 1 cycle per second are transmitted but signals of a higher frequency are attenuated. In this case however, there will be some loss of D. C. component, since the D. C. boost afforded by circuit 7, 10 and compensating for the D. C. loss in resistors 12, 13 is absent. In such an arrangement the filter circuits which are respectively in the A. C. and D. C. paths are at different parts of the signal channel.

Figure 5 shows a signal channel in which the A. C. path is provided with two filter circuits at different parts of said path. Television signals are applied to the input electrodes of tube 1 via terminals 2 and 3, resistor 21 again representing the output load of a preceding stage, and the anode of tube 1 is connected to positive H. T. terminal 9 via resistors 6 and 7, the junction of which is connected to ground via capacitor 10, resistor 6 and capacitor 10 forming a filter circuit which transmits signals of a frequency below 1 cycle per second but attenuates signals of a higher frequency. The D. C. component of the output from tube 1 is fed to output terminal 4 via resistor 12, which with resistor 13 between output terminals 4 and 5 provides a potentiometer circuit as described in connection with Figure 1. The A. C. path between the anode of tube 1 and output terminal 4 comprises an electron discharge tube 26, a capacitor 27 connected between the anode of tube 1 and the control electrode of tube 26, and a capacitor 31 connected between the cathode of tube 26 and terminal 4. The cathode of tube 26 is connected to ground via resistors 29 and 30, and a resistor 28 is connected between the control electrode of tube 26 and the junction of resistors 29 and 30. Tube 26 is thus arranged to operate as a cathode follower. Capacitor 27 and resistor 28 form a first filter circuit in the A. C. path, and capacitor 31 and resistor 13 form a second filter circuit in said path, the total effect of said filter circuits in said path being to provide attenuation of signals below the field frequency.

A signal channel according to the invention may be arranged in any suitable part of the circuit of the television receiver, for example between the final amplifying tube and the cathode ray tube, as described, or between the detector tube and the next following tube of the circuit.

What I claim is:

1. A television receiver including a picture reconstituting device operating at line and field frequencies, a signal channel connecting the signal input of said receiver to said device, said channel including an electron discharge tube having a cathode, a control electrode and an anode, an alternating current path connected to said tube for passing signals of the field and higher frequencies, a direct current path connected to said tube for passing signals of zero frequency, said alternating current path and said direct current path comprising a pair of resistors in series between said anode and a positive supply terminal, a capacitor connected between the junction of said resistors and ground, a second capacitor having one electrode connected to said anode, a resistor connected between ground and the other electrode of said second capacitor, and a resistor connected between the junction of said pair of resistors and said other electrode of said second capacitor, said first-mentioned capacitor and the resistor connected to said positive supply terminal being proportioned to serve as a filter to attenuate signal components at a frequency higher than 1 cycle per second, and said second capacitor and said third resistor being proportioned to serve as a filter to attenuate signals at frequencies below the field frequency, whereby on the application of signals having D. C. and A. C. components to said cathode and control electrode signals are obtained between the ends of said third resistor in which components at frequencies between the field frequency and a frequency of 1 cycle per second are attenuated.

2. A television receiver comprising a signal channel including an electron discharge tube having a cathode, a control electrode and an anode, a first resistor, said cathode being connected to ground and said anode being connected to a positive supply terminal via said first resistor, second and third resistors connected in series between said anode and ground, a first capacitor connected between the junction of said second and third resistors and ground, and a second capacitor and a fourth resistor connected in series between said anode and the ungrounded electrode of said first capacitor, said second resistor and said first capacitor being proportioned to serve as a filter for attenuating signals having frequencies above 1 cycle per second, said second capacitor and fourth resistor being proportioned to serve as a filter for attenuating signals at frequencies below the field frequency, said second and fourth resistors providing a D. C. signal path and said second and third resistors forming a potentiometer to determine the ratio of the D. C. and A. C. components of the signals transmitted by said channel, whereby upon the application to said cathode and control electrode of signals having D. C. and A. C. components signals are obtained between ground and the junction of said second capacitor and fourth resistor in which signals at frequencies between the field frequency and 1 cycle per second are attenuated.

3. A television receiver according to claim 2 wherein said signal channel has an attenuation versus frequency curve having maximum attenuation corresponding to a frequency of 1 to 3 cycles per second.

4. A television receiver including a picture reconstituting device operating at line and field frequencies, a signal channel connecting the signal input of said receiver to said device, said channel including an electron discharge tube having a grounded cathode, a control electrode and an anode, an alternating current path connected to said tube for passing signals of field and higher frequencies, a direct current path connected to said tube for passing signals of zero frequency, said alternating current path and said direct current path comprising a pair of resistors connected in series between said anode and a positive supply terminal, and a first capacitor connected between the junction of said resistors and ground, a second capacitor having one electrode connected to said control electrode, third and fourth resistors each having one terminal connected to the respective electrodes of said second capacitor, a third capacitor, the other terminals of said third and fourth resistors being connected to one electrode of said third capacitor, the other electrode of said third capacitor being grounded, a fourth capacitor having one electrode connected to said anode, a fifth resistor connected to the other electrode of said fourth capacitor and ground, and a sixth resistor in shunt with said fourth capacitor, said second resistor and first capacitor forming a filter and said third resistor and third capacitor forming a filter, said filters being proportioned to attenuate signals at frequencies above 1 cycle per second upon the application of television signals between ground and the junction of said third resistor and said second capacitor, and said fourth capacitor and fifth resistor being proportioned to attenuate signals below the field frequency, whereby in the signals set up between ground and the ungrounded end of said fifth resistor signals at frequencies between the field frequency and the frequency of 1 cycle per second are attenuated.

5. A television receiver including a picture reconstituting device operating at line and field frequencies, a signal channel connecting the signal input of said receiver to said device, said channel including an electron discharge tube having a grounded cathode, a control electrode and an anode, an alternating current path connected to said tube for passing signals of field and higher frequencies, a direct current path connected to said tube for passing signals of zero frequency, said alternating current path and said direct current path comprising first and second resistors connected in series between said anode and a positive supply terminal, a first capacitor connected between the junction of said first and second resistors and ground, third and fourth resistors connected between said anode and ground, a second electron discharge tube having a cathode, a control electrode and an anode, fifth and sixth resistors connected in series between the cathode of said second tube and ground, a second capacitor having one electrode connected to said anode and the other electrode connected to the control electrode of said second tube, a seventh resistor connected between the control electrode of said second tube and the junction of said fifth and sixth resistors, and a third capacitor connected between the cathode of said second tube and the junction of said third and fourth resistors, said third resistor affording a D. C. path between the anode of said first tube and the junction of said third and fourth resistors and said first resistor and first capacitor being proportioned to form a filter for attenuating signals at frequencies above 1 cycle per second, said second capacitor, second electron discharge tube and third capacitor affording an A. C. path between the anode of said first tube and the junction of said third and fourth resistors, and said second capacitor and seventh resistor together with said third capacitor and fourth resistor being proportioned to form filter means for attenuating signals at frequencies below the field frequency, whereby upon the application to the cathode and control electrode of said first tube of signals having D. C. and A. C. components there are obtained between ground and the junction of said third and fourth resistors signals in which components at frequencies between the field frequency and a frequency of 1 cycle per second are attenuated.

6. A television receiver including a picture reconstituting device operating at line and field frequencies, a signal channel connecting the signal input of said receiver to said device, said channel including an electron discharge tube, an alternating current path connected to said tube for passing signals of the field and higher frequencies, a direct current path connected to said tube for passing signals of zero frequency, and means for attenuating those frequencies lying between 1 cycle per second and field frequency more than other frequencies in said channel to substantially reduce fading of the mean brightness of the reconstituted picture due to television signals reflected from moving objects.

7. A television receiver including a picture reconstituting device operating at line and field frequencies, a signal channel connecting the signal input of said receiver to said device, said channel including an electron discharge tube, an alternating current path connected to said tube and including first attenuating means for attenuating signals the more the lower the signal frequency and a direct current path including second attenuating means for attenuating signals the more the higher the signal frequency, said first and second attenuating means being proportioned to attenuate at least some of the signal frequencies between field frequency and zero frequency to substantially reduce fading of the mean brightness of the reconstituted picture due to television signals reflected from moving objects.

8. A television receiver according to claim 7, said first and second attenuating means being proportioned to attenuate frequencies between the field frequency and a frequency of 1 cycle per second more than other frequencies.

CHARLES LESLIE FAUDELL.

References Cited in the file of this patent

UNITED STATES PATENTS

| Number | Name | Date |
|---|---|---|
| 2,093,665 | Tellegen | Sept. 21, 1937 |
| 2,223,982 | Bedford | Dec. 3, 1940 |
| 2,269,001 | Blumlein | Jan. 6, 1942 |
| 2,431,973 | White | Dec. 2, 1947 |
| 2,484,052 | Rose | Oct. 11, 1949 |
| 2,503,540 | Augustadt | Apr. 11, 1950 |

FOREIGN PATENTS

| Number | Country | Date |
|---|---|---|
| 505,899 | Great Britain | May 15, 1939 |